May 4, 1965
R. J. FIEDLER
3,182,251
RELAY INDICATING AND TESTING CIRCUIT
Filed July 31, 1962
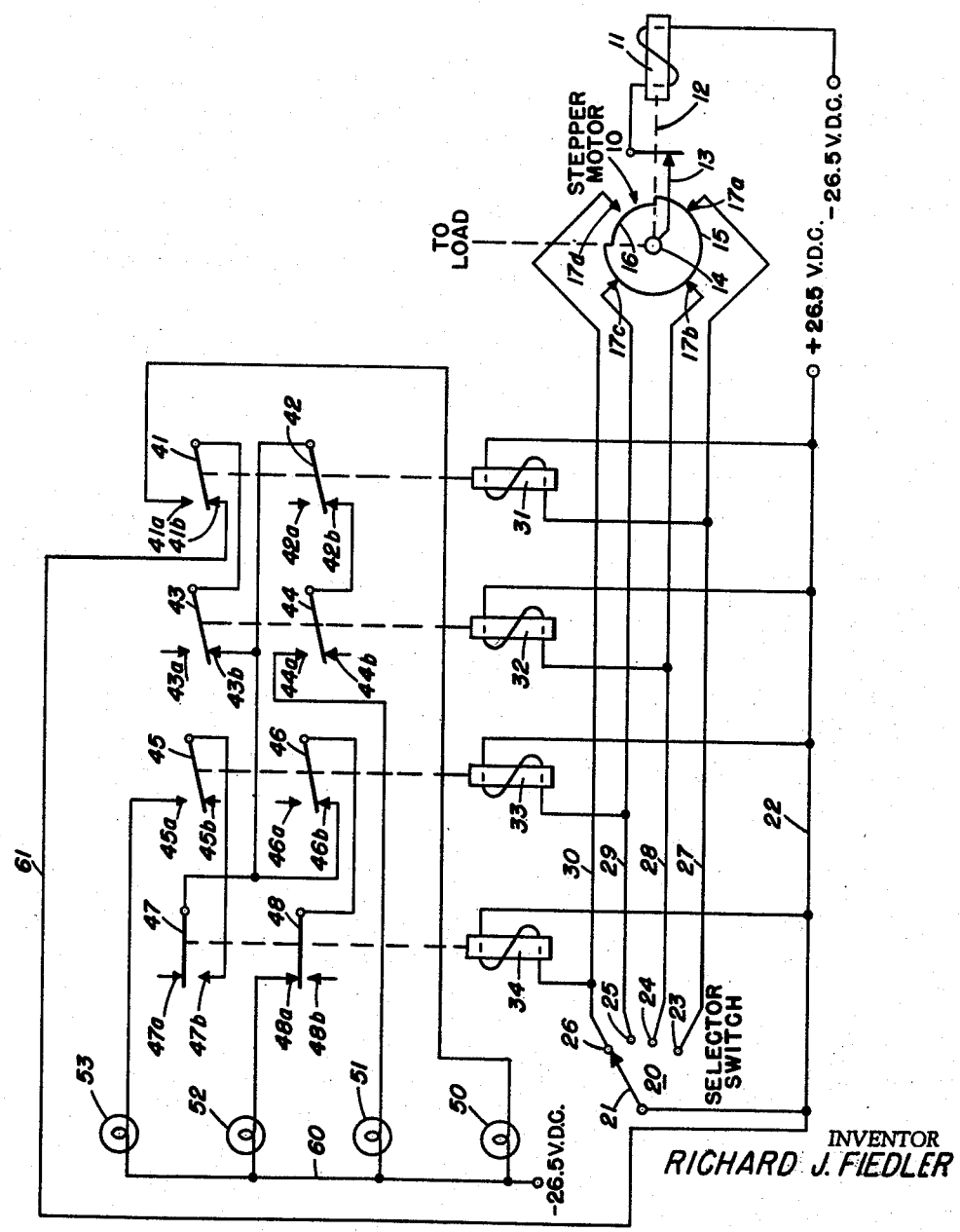
INVENTOR
RICHARD J. FIEDLER
BY Claude Funkhouser
ATTORNEY "# United States Patent Office 3,182,251
Patented May 4, 1965

3,182,251
RELAY INDICATING AND TESTING CIRCUIT
Richard J. Fiedler, Pittsfield, Mass., assignor, by mesne assignments, to the United States of America as represented by the Secretary of the Navy
Filed July 31, 1962, Ser. No. 213,829
4 Claims. (Cl. 324—28)

This invention relates to a relay indicating and testing circuit and more particularly to a relay controlled indicator circuit for monitoring the operation of a remotely located electro-mechanical device and for simultaneously giving an indication in the event of faulty operation of the device and/or defect in the indicator circuit.

In prior art circuits of this nature it was the practice to energize only the relay immediately associated with the indicator corresponding to the condition selected by the operator. In applications where the operator may select one of a plurality of conditions, a plurality of relays and associated indicators were usually provided such that all of the various selected conditions may be monitored. When the condition selected by the operator did not correspond to the condition obtained at a remote location, the related relay would not be energized and the associated indicator would indicate this lack of correspondence. An important disadvantage of a relay circuit of this type is that there is no convenient way in which the relay circuit itself can be checked to determine if the remaining relays are in operating condition.

It is the purpose of the present invention to overcome the above-noted disadvantage by incorporating a testing feature in the relay circuitry. This is accomplished in a simple and ingenious manner by causing all the relays to operate except the one relay corresponding to the condition selected by the operator. In this manner the operability of all of the relays except one is determined whereas in the past only the one relay which should be energized could be checked.

An object of this invention is to provide a monitoring circuit incorporating testing features.

A further object is the provision of a checking relay circuit of maximum reliability having a minimum of components.

A still further object is to provide a relay controlled indicating circuit which incorporates testing features and allows for ready location of defective components with a minimum of checking.

Other objects and many of the attendant advantages of this invention will be readily appreciated as the same becomes better understood by reference to the following detailed description when considered in connection with the accompanying drawings and the attendant claims in which:

The sole figure of the drawings shows a circuit diagram illustrating one embodiment of the invention.

Referring to the sole figure of the drawings there is shown a stepper motor 10 which may be conveniently located at a point remote from the rest of the circuit. This stepper motor, which may be of conventional design, is "stepped" through discrete increments of rotation under the control of selector switch 20 in a manner to be described hereinafter. The stepper motor includes a stepping coil 11 connected to a —26.5 volt supply which, when energized, attracts the armature, shown diagrammatically at 12, which is coupled to a circuit interrupter 13 and to the shaft 14 via a ratchet and pawl arrangement not shown. The stepper motor operates in a conventional manner in that attraction of armature 12 "steps" the shaft 14 through a predetermined arc and simultaneously operates circuit interrupter 13 to disrupt current flow to the coil 11. De-energization of the coil allows the armature 12 to be returned to its original position by a spring, not shown, whereupon the circuit through the interrupter 13 to the coil 11 is completed and the sequence repeats. The reciprocating motion of the armature 12 "steps" the shaft 14, which is connected to a load as shown, through discrete increments of rotation. An electrically conductive disc 15 having a notched portion 16 is mounted for rotation with the shaft 14 while circumferentially spaced electrically contacts 17a, 17b, 17c, and 17d bear against the periphery thereof.

The selector switch 20 includes a switch arm 21 connected to a +26.5 volt supply over line 22 and terminals 23 through 26 which are selectively contacted by the switch arm 21. Lines 27 through 30 connect switch terminals 23 through 26 to the contacts 17a through 17b, respectively, of the stepper switch 10 to form a plurality of individual circuits from the +26.5 volt supply through line 22, the switch arm 21, the switch terminals, the stepper motor contacts, the conductive disc 15, the circuit interrupter 13, the stepper coil 11 and on to the —26.5 volt supply. Relays 31 through 34 are connected across the selector switch 20 from lines 27 through 30, respectively, to line 22 for energization by the +26.5 volt supply which is applied thereto. The armature of each relay controls ganged contact arms to engage relay contacts in both the upper and lower positions as where relay 31 controls contact arms 41 and 42 to selectively engage upper or lower relay contacts 41a, 41b, and upper or lower relay contacts 42a or 42b, respectively. The indicator circuit which is under the control of the various relays includes a plurality of distinct parallel paths, each of which may be traced from line 60, which is energized from a —26.5 volt source, through one of the indicator lamps 50 through 53 and the various relay arms and contacts to line 61, line 22 and the +25.6 volt supply. It will be noted that each of the indicator branch circuits is traced through one contact arm and one associated relay contact of each of the relays to thereby form an "interlock" such that if any one of the relays does not function the indicator branch circuit will be broken and the indicator lamp will not be energized. In tracing the branch circuit containing indicator lamp 52, for example, it is seen that included in this branch circuit are relay contact 48a and arm 48 of relay 34, arm 46 and contact 46b of relay 33, contact 43b and arm 43 of relay 32, and contact arm 41 and relay contact 41b of relay 31.

Before considering the operation of the circuit, it is important to note that each of the relay coils should have a substantially greater resistance value than that of the stepper coil 11, for example 500 ohms resistance in each of the relay coils as compared to 7 ohms resistance in the stepper coil. To initiate operation, the contact arm 21 of selector switch 20 is operated to engage any one of the several terminals 23 through 26 in accordance with the desired condition to be established at the location of the stepper motor 10. Positions of the various relay contact arms are shown for the situation where contact arm 21 engages terminal 26 of the selector switch 20 and stepper motor 10 is shown in the position it would assume at the conclusion of its "stepping" movement. With the selector arm 21 of the selector switch engaging terminal 26 a +26.5 volt potential will be established at contact 17d of the stepper motor while the potential at the remaining contacts of the stepper motor will be substantially less because of the voltage drop across the coils of relays 31 through 33. As can readily be seen from the drawings, relays 31 through 33 are energized while relay 34 is not because of the short placed across it by the position of the contact arm 21 of the selector switch. Before such time when the contact 17d is disposed in the notch 16 of disc 15 the potential on this contact is sufficient to actuate stepper coil 11 and thus intermittently rotate the disc 15. Upon arrival of the notched portion 16 of the disc beneath"

contact 17d, rotation ceases since the potential on the remaining contacts 17a through 17c is insufficient to actuate stepper coil 11. The angular position of the shaft 14 will produce the desired condition at the load in accordance with the position of arm 21 of the selector switch 20. Returning now to the indicator circuit it will be seen that indicator lamp 52 will be illuminated since it is the only lamp having a completed circuit from the −26.5 volt supply on line 60 to the +26.5 volt supply on line 22. If for some reason the stepper motor stops in a position where a contact other than 17b is disposed in the notch, a second relay will drop out and none of the indicators will be activated due to the interlock circuit arrangement thus denoting a malfunction. It should also be noted that none of the indicator lamps will be illuminated if any relay besides the one shorted by the selector switch fails to operate because of a defect. Due to this arrangement, all the relays except the one shorted by the selector switch are checked for operability and thus there is provided a much more comprehensive check of the system than if only one of the relays was activated while the others remain inactivated.

It should be appreciated that, based on the principles taught by the present invention, any number of conditions may be selected by the selector switch 20 merely by increasing the capacity of the selector switch, increasing the number of indicator branch circuits and relays, and by modifying the disc 15 affixed to the stepper motor shaft 14 to accommodate a greater number of contacts.

Various modifications are contemplated and may obviously be resorted to by those skilled in the art without departing from the spirit and scope of the invention, as hereinafter defined by the appended claims, as only preferred embodiment thereof has been disclosed.

What is claimed is:

1. A circuit for indicating the operating of a remotely located electromagnetic device, said circuit having testing capabilities, comprising:
   (a) a selector switch having a contact arm and a plurality of terminals,
   (b) individual energization circuits connected to each terminal of said selector switch for actuating said electro-mechanical device,
   (c) means coupled to said electro-mechanical device for sequentially interrupting said individual energization circuits,
   (d) a plurality of relays connected across said selector switch from said individual energization circuits to said contact arm and
   (e) an indicator circuit controlled by said plurality of relays whereby upon manipulation of said selector switch said electro-mechanical device is actuated over one of said individual energization circuits until the latter is broken by said interrupting means and one of said relay is de-energized to complete said indicator circuit.

2. The circuit of claim 1 wherein said interrupting means includes:
   (a) a current conductive disc mounted on said electro-mechanical device and having a notched peripheral portion, and
   (b) a contact connected to each of said individual energization circuits and positioned to engage said current conductive disc at the periphery thereof.

3. A circuit for indicating the operation of a remotely located electromagnetic device, said circuit having test capabilities, comprising:
   (a) a selector switch having a contact arm for selectively engaging a plurality of terminals,
   (b) a current conductive disc having a notched peripheral portion mounted for rotation with said electro-mechanical device,
   (c) individual contacts connected to each of said terminals of said selector switch and positioned to engage said current conductive disc at the periphery thereof to provide a plurality of separate energization circuits for said electro-mechanical device,
   (d) individual relays having coils connected across said selector switch from said contact arm to each of said terminals such that one of said relay coils is shorted out by said selector switch, and
   (e) a plurality of parallel indicator circuits controlled by each of said relays, whereby selective operation of said selector switch contact arm places a potential on one of said contacts over the associated energization circuit sufficient to operate said electro-mechanical device until said one contact is located immediately above the notched peripheral portion of said disc and simultaneously de-energizes one of said relays to complete a circuit for only one of said indicator circuits.

4. A relay checking and indicating circuit comprising:
   (a) an indicator circuit consisting of a plurality of parallel circuits where each of said parallel circuits includes an indicator lamp and a plurality of relay controlled switch means,
   (b) a stepper motor,
   (c) a current conductive disc having a notched peripheral portion mounted for rotation with said stepper motor,
   (d) a plurality of contact members positioned for engaging said disc at the periphery thereof,
   (e) a selector switch having a contact arm and a plurality of terminals,
   (f) a plurality of energization circuits for actuating said stepper motor where each of said energization circuits includes one of said selector switch terminals and one of said contacts, and
   (g) a relay connected across said selector switch from each of said energization circuits to said contact arm, whereby operation of said contact arm to engage one of said selector switch terminals simultaneously places a potential on one of said contacts sufficient to actuate said stepper motor over the selected one of said energization circuits until the notched peripheral portion of said disc is disposed beneath said one of said contacts and de-energizes the relay connected to said selected energization circuit to control said switch means for energization of a single one of said indicator lamps.

References Cited by the Examiner
UNITED STATES PATENTS 2,755,458   7/56   Rooks _____ 340—332
2,833,983   5/58   Shaw _____ 324—28

FOREIGN PATENTS 610,918   12/60   Canada.

OTHER REFERENCES

Batson, D. L.: "Relay Tester," in IBM Technical Disclosure Bulletin, vol. 9, Feb. 1962, pp. 11, 12.

NEIL C. READ, *Primary Examiner.*